United States Patent [19]

Watanabe et al.

[11] Patent Number: 4,916,254

[45] Date of Patent: Apr. 10, 1990

[54] PROCESS FOR PRODUCING EPSILON-CAPROLACTONE-MODIFIED HYDROXYALKYL ACRYLATE OR METHACRYLATE AND COATING COPOLYMER FROM THE SAME

[75] Inventors: Shoji Watanabe; Kiyoshi Okitsu, both of Ohtake, Japan

[73] Assignee: Daicel Chemical Industries, Ltd., Sakai, Japan

[21] Appl. No.: 244,525

[22] Filed: Sep. 9, 1988

Related U.S. Application Data

[63] Continuation of Ser. No. 373,306, Apr. 29, 1982, abandoned.

[30] Foreign Application Priority Data

May 11, 1981 [JP] Japan .................................. 56-70336
May 29, 1981 [JP] Japan .................................. 56-82182

[51] Int. Cl.$^4$ ............................................. C07C 69/66
[52] U.S. Cl. .................................... 560/185; 560/189; 560/209
[58] Field of Search ........................ 560/185, 189, 209

[56] References Cited

U.S. PATENT DOCUMENTS

| | | | |
|---|---|---|---|
| 3,654,347 | 4/1972 | Kincaid et al. | 560/185 |
| 3,655,631 | 4/1972 | Fraser et al. | 528/354 |
| 3,806,495 | 4/1974 | Schoen | 560/185 |
| 3,920,732 | 11/1975 | Radlove | 560/209 |
| 4,112,235 | 9/1978 | Schmerling | 560/217 |
| 4,188,472 | 2/1980 | Chang | 528/75 |

OTHER PUBLICATIONS

Billmeyer, Fred W. Jr., *Textbook of Polymer Science*, 3rd Ed., (1984), John Wiley & Sons, Publ. pp. 56–68.

*Primary Examiner*—Paul J. Killos
*Attorney, Agent, or Firm*—Flynn, Thiel, Boutell & Tanis

[57] ABSTRACT

ε-caprolactone-modified hydroxyalkyl acrylate or methyacrylate can be effectively produced from ε-caprolactone and a hydroxyalkyl acrylate or methacrylate in the presence of a stannous halide as a catalyst. The obtained monomer is used together with another copolymerizable monomer to produce a copolymer which is suitable for coating and photocurable composition.

8 Claims, 1 Drawing Sheet

PROCESS FOR PRODUCING EPSILON-CAPROLACTONE-MODIFIED HYDROXYALKYL ACRYLATE OR METHACRYLATE AND COATING COPOLYMER FROM THE SAME

This application is a continuation of U.S. Ser. No. 373,306, filed Apr. 29, 1982 abandoned.

BACKGROUND OF THE INVENTION

1. Field of the Invention

The invention relates to a process for producing an ε-caprolactone-modified hydroxyalkyl acrylate or methacrylate and then a copolymer suitable for coating from the same and another monomer.

2. Description of Prior Arts

Recently, the importance of acrylic paints in the coating field has increased.

A reason therefor is that, as compared with alkyd resins, polyester resins and epoxy resins, the acrylic paints have superior weather resistance, physical properties, chemical resistance and stain resistance. The acrylic coatings are, therefore, used for the production of motorcars, household electric appliances, metals and construction materials in various fields.

Among acrylic resins, an acrylic polyol obtained by polymerizing hydroxyl group-containing monomer is further incorporated with a cross-linking agent reactive with the hydroxyl group, such as polyisocyanate or melamne resin, and used as a cold-setting or baking-setting paint. The hydroxyl group-containing acrylic monomers are indispensable also for obtaining coating films having a high adhesion and gasoline resistance.

As the hydroxyl group-containing monomer, there have been used, for example, hydroxyethyl acrylate, hydroxyethyl methacrylate, hydroxypropyl acrylate and hydroxypropyl methacrylate.

However, the acrylic polyols obtained by the copolymerization of the above-mentioned monomers have an insufficient reactivity with a cross-linking agent, since the hydroxyl group is located at a position very close to the main chain of the stiff acrylic resin skeleton.

Recently, from the viewpoint of saving energy or resources, acrylic paints having higher solidifying properties and lower-temperature setting properties are demanded in the coating field. For satisfying this requirement, it is necessary to increase the reactivity of the hydroxyl group in the acrylic polyols.

For this purpose, 4-hydroxybutyl acrylate of the following formula has been proposed:

However, 4-hydroxybutyl acrylate is expensive and its reactivity is still insufficient. Further, there has been proposed also a lactone-modified acrylic polyol of the following structure obtained by adding ε-caprolactone to the hydroxyl group of an acrylic polyol resin:

This modified compound has attracted attention as a low-temperature setting, high solid-type paint, since the hydroxyl group is located at a position distant from the main chain. However, the process for reacting the acrylic polyol resin with ε-caprolactone has many disadvantages. One of them is that the reaction is limited by the type of solvent used, since the acrylic polyol resin is in the form of a solution in a large quantity of the solvent. For example, the addition reaction with ε-caprolactone requires as high a temperature as possible. However, if a solution of acrylic polyol in toluene solvent is used, the reaction temperature cannot be elevated beyond 110°–120° C. In addition, the reaction velocity is very low, since it is diluted with the solvent. If the quantity of a catalyst for the ring-opening reaction of ε-caprolactone is increased so as to enhance the reaction velocity, the resin solution is seriously colored and no practically valuable products can be obtained. Further, such a large amount of the catalyst contained in the acrylic polyol paint exhibits quite bad influences on changes in storage stability with time, reactivity with a hardening agent and physical properties of the coating film after a long period of time.

In general, the hydroxyl group-containing monomers used for the production of acrylic polyols include hydroxyethyl methacrylate, hydroxyethyl acrylate, and hydroxypropyl methacrylate. A polymer copolymerized with these monomers does not react completely with a cross linking agent because the hydroxyl groups which take part in crosslinking are positioned near the rigid main chain of the acrylic resin skeleton. The insufficient reactivity of the hydroxyl groups results in unsatisfactory coating properties even when the acrylic polyol resin is reduced in molecular weight to increase the solid content. On the other hand, a soft acrylic polyol was synthesized to obtain an elastic coating by incorporating acrylic resin with a large quantity of monomers which lowers the glass transition temperature (Tg). Such an acrylic polyol, however, has a drawback that the resulting coating film is liahle to suffer blocking due to the soft side chains and is easy to become stiff at low temperatures, losing resilience.

In order to overcome these disadvantages, an attempt was made to graft-polymerize alkyd resin to acrylic resin. This attempt was not successful because alkyd resin contains secondary hydroxyl groups which are poor in reactivity and because the resulting coating film has greatly decreased performance in weather resistance and water resistance.

It has also been proposed to copolymerize 4-hydroxybutyl acrylate, as the hydroxyl group-containing monomer, so that the primary hydroxyl groups are positioned far away from the main chain. This proposal is not acceptable because the monomer is expensive and is not sufficient in reactivity.

Recently, there has been proposed a lactone-modified acrylic polyol prepared by the ring opening polymerization of ε-caprolactone to the hydroxyl group of acrylic polyol resin. This resin is greatly reactive with a crosslinking agent because of the highly reactive primary hydroxyl groups which are positioned far away from the main chain. This resin used to be produced by adding ε-caprolactone to an acrylic polyol resin and then carrying out ring opening polymerigation in the presence of a catalyst (Refer to Japanese Laidopen Patent No. 48-66194 (1973).) This resin is also produced by copolymerizing acrylic polyol in ε-caprolactone and then adding by ring opening ε-caprolactone to hydroxyl groups of the acrylic polyol in the presence of a catalyst. (Refer to Japanese Laid-open Patent No. 54-133590 (1979).) Further, there has been proposed a process for carrying out simultaneously ring opening polymerization of ε-caprolactone and radical polymerization of vinyl monomers by adding a radical initiator, a catalyst for ring opening polymerization of ε-caprolactone, ε-caprolactone, hydroxyl group-containing vinyl monomers, other vinyl monomers, and solvent. (Refer to U.S. Pat. No. 4,082,816.) This process, however, has a drawback that the reaction temperature is limited by the boiling point of the solvent used for the polymerization of acrylic monomers. In the case of commonly used solvents such as toluene and butyl acetate, the reaction temperature is 110° to 120° C., and the ring opening polymerization of ε-caprolactone to hydroxyl groups is very slow at this temperature. In order to increase the reaction rate, it is necessary to use a large quantity of catalyst for ring opening polymerization. Such a catalyst is usually a tin or titanium compound which discolors considerably the resulting resin. In addition, when the resin is used for painting, the catalyst adversely affects the stability of the paint and the performance of the resulting coating film.

Discoloration is fatal to the acrylic polyol resin which is characterized by the absence of color among many coating resins. Acrylic polyol colored yellowish brown is by no means good for practical use.

In the case where xylene and ethylene glycol monoethyl ether acetate are used as the solvent, it is possible to employ a reaction temperature higher than 140° C. However, if a titanium catalyst, which is highly reactive, is used, an undesirable ester interchange reaction takes place as shown in the following chemical equation.

British Patent No. 1257 638 discloses reaction of 2-hydroxyethyl acrylate with caprolactone in the presence of an acidic catalyst.

In order to synthesize a lactone-modified acrylic polyol which contains only a small quantity of metal catalyst, causes very little discoloration, and permits one to select any solvent, the present inventors carried out a series of intensive studies which led to the development of a production process which is entirely different from the conventional technique. The present invention is based on such development.

SUMMARY OF THE INVENTION

The inventors made intensive investigations for the purpose of synthesizing an ε-caprolactone-modified acrylic polyol by a process comprising synthesizing an ε-caprolactone-added hydroxyalkyl acrylate or methacrylate and then copolymerizing the resulting monomer to synthesize a lactone-modified acrylic polyol, which process is different from a conventional one comprising reacting an acrylic polyol resin with ε-caprolactone. As a result, the inventors have found that a polycaprolactone-modified hydroxyalkyl acrylate or methacrylate useful for the synthesis of lactone-modified acrylic polyols can be produced by the ring-opening polymerization of ε-caprolactone with a hydroxyalkyl acrylate or methacrylate in the presence of a stannous halide excluding stannous fluoride. The present invention has been completed on the basis of these findings.

The present invention relates to a process for producing a polycaprolactone-modified hydroxyalkyl acrylate or methacrylate by the ring-opening polymerization of a hydroxyalkyl acrylate or methacrylate with ε-caprolactone, characterized in that a stannous halide, excluding stannous fluoride, of the general formula:

$$SnX_2$$

wherein X represents Cl, Br or I, is used as a ring-opening polymerization catalyst.

In the ring-opening polymerization of ε-caprolactone with a hydroxyl group-containing substance, the reaction has been carried out in the presence of a titanium catalyst, such as tetrabutyl titanate, tetraethyl titanate or tetrapropyl titanate, or an organotin compound, such as dibutyltin dilaurate, dibutyltin oxide or tin octylate, at 130°–230° C. in the prior art. However, it is difficult to effect the addition reaction of ε-caprolactone with a hydroxyl group-containing acrylic or methacrylic ester at a temperature of at least 130° C., since the acrylic ester- per se polymerizes thermally. At a temperature below 130° C., the ring-opening reaction velocity of ε-caprolactone is very low, although the polymerization of the acrylic ester per se can be prevented. Particularly when the above-mentioned organotin catalyst having a low activity is used, the reaction does not proceed unless a large amount of the catalyst is used. However, the use of such a large amount of the metal compound exerts an adverse influence upon the use of the product as a monomer copolymerizable with acrylic resin. Though the titanium catalysts have a relatively high activity and are effective for obtaining an intended product, they have also a high activity as interesterification catalyst. Therefore, the interesterification reaction also proceeds in the course of the intended reaction. In such a case, a polyhydric alcohol and a hydroxyalkyl diacrylate or hydroxyalkyl dimethacrylate are by-produced from 2 mols of a hydroxyalkyl acrylate or hydroxyalkyl methacrylate.

This phenomenon is shown by the following reaction formula:

-continued

The above diacrylate or dimethacrylate having a high boiling point cannot be separated easily from the intended product. If the intended product containing these by-products is radical-copolymerized with another acrylic ester in a solvent, a three dimensional cross-linkage is formed in the resulting resin to increase its viscosity remarkably or cause gelation. However, surprisingly, if the stannus halide excluding stannous fluoride is used as the catalyst in the ring-opening polymerization of ε-caprolactone with a hydroxyalkyl acrylate or methacrylate according to the present invention, the reaction proceeds satisfactorily at a temperature of as low as 80°–130° C. with only a small amount of said catalyst, since the catalyst has a high catalytic activity and, in addition, the by-production of the diacrylate or dimethacrylate by the interesterification reaction is only slight.

Figure 1:
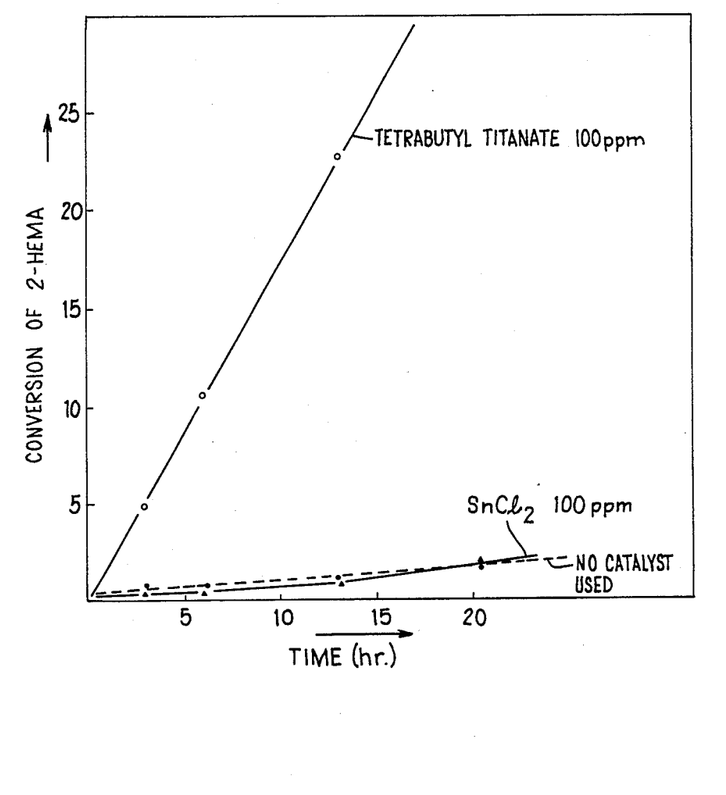
The drawing is a graph showing influences of various catalysts on the interesterification reaction.

Effects of stannous chloride catalyst used in the present invention and tetrabutyl titanate catalyst used in the prior art on the interesterification reaction were examined by the following tests.

Each catalyst was added to 2-hydroxyethyl methacrylate (2-HEMA) and the mixture was heated to 120° C. The rate of formation of ethylene glycol dimethacrylate (EGDM) and ethylene glycol (EG) by the interesterification reaction was examined to obtain results shown in the drawing. The conversion of 2-HEMA in the drawing a value calculated according to the following formula:

$$\text{Conversion of 2-HEMA (mol)} = \frac{\text{EGDM} + \text{EG}}{\text{2-HEMA}} \times 100$$

It is apparent from the drawing that when tetrabutyl titanate catalyst was used, the amount of 2-hydroxyethyl methacrylate was reduced, since it was converted into ethylene glycol dimethacrylate and ethylene glycol by the interesterification reaction. When stannous chloride was used according to the present invention, the interesterification reaction was negligible.

Accordingly, if the polycaprolactone-modified hydroxyalkyl acrylate or methacrylate synthesized by the process of the present invention is used as a monomer copolymerizable with the acrylic polyols resin, it becomes possible to synthesize an acrylic resin without causing any gelation or increase in viscosity. Therefore, they are suitable for the production of a resin solution having a high solid content for high-solid paints which have been demanded eagerly recently.

As the hydroxyalkyl acrylate or methacrylate used in the present invention, there may be mentioned, for example, 2-hydroxyethyl methacrylate, 2-hydroxyethyl acrylate, hydroxypropyl methacrylate, hydroxypropyl acrylate, 1,4-butylene glycol monomethacrylate and 1,4-butylene glycol monoacrylate.

ε-Caprolactone is used in an amount of 1–20 mol, preferably 1–5 mol, per mol of the hydroxyalkyl acrylate or hydroxyalkyl methacrylate. If ε-caprolactone is used in a larger amount, it becomes difficult to dissolve the same in the solvent because of the crystallization of polycaprolactone.

However, in fact, if 1 mol of ε-caprolactone is reacted with 1 mol of hydroxyalkyl methacrylate, the ring-opening reaction velocity of ε-caprolactone with the hydroxyl group of hydroxyalkyl methacrylate is nearly equal to the ring-opening reaction velocity of ε-caprolactone with the terminal hydroxyl group of the resulting caprolactone. Therefore, the resulting product comprises a mixture of compounds of the following formula.

wherein R represents an alkylene group and n represents 0, 1, 2, 3, . . . Namely, the mixture comprises compounds of the above formula wherein n distributes statistically from O (i.e. unreacted compound) to 1, 2, 3, 4, 5 . . . (polycaprolactone). An average number of n is preferably 0.3 to 20.

It is unnecessary, however, to isolate or to purify the compounds constituting the mixture. The mixture can be used as such as the copolymerizable monomer in the synthesis of the acrylic resin.

As the stannous halides excluding stannous fluoride used in the present invention, there may be mentioned stannous chloride, stannous bromide and stannous iodide.

Among them, stannous chloride is particularly preferred, since the product obtained in the presence of stannous chloride is only slightly colored.

The catalyst is used in an amount of 1–1000 ppm, preferably 5–100 ppm. If the amount is larger than 1000 ppm, the coloration of the resulting product is significant and articles finally produced from this product contain a large amount of metallic tin which exerts bad influences on storage stability and durability of the articles such as paints in many cases. If the amount is less than 1 ppm, the reaction velocity is reduced considerably.

The reaction temperature is in the range of 80°–150° C., preferably 100°–140° C. If the temperature is lower than 80° C., the reaction velocity is low. If the temperature is higher than 150° C., thermal polymerization of the acrylic ester might occur during the reaction to cause gelation. It is preferred to incorporate a polymerization inhibitor in the reaction system.

As the polymerization inhibitor, a common compound such as hydroquinone, hydroquinone monomethyl ether or phenothiazine is used in an amount in the range of 0.01–5%, preferably 0.05–1.0%.

No gas is introduced in the reaction system, since if an inert gas such as nitrogen gas is introduced therein, the radical polymerization is liable to occur. Alternatively, air or the like is introduced therein to prevent thermal polymerization of the reactants.

By the copolymerization of the hydroxyl group-containing acrylic or methacrylic ester modified with caprolactone according to the present invention with a radical-polymerizable monomer, there can be obtained an acrylic polyol resin having an excellent reactivity with a cross-linking agent and a high flexibility. The modified ester of the present invention may be reacted with a polyisocyanate to synthesize a flexible, urethane bond-containing, polyfunctional acrylate or methacrylate.

The present invention relates to a process for producing a coating copolymer which comprises copolymerizing 5 to 70 wt % of ε-caprolactone-modified vinyl monomer represented by the formula:

(where $R_1$ is a hydrogen atom or alkyl group; $R_2$ is $C_mH_{2m}$ (m is an integer of 2 and up); and n is especially 0.3 to 5 on the average.) and 95 to 30 wt % of other copolymerizable vinyl monomers.

According to the conventional technique, ε-caprolactone is reacted with acrylic polyol resin, whereas according to the process of this invention, lactone-modified acrylic polyol is produced by copolymerizing ε-caprolactone-modified vinyl monomers with other vinyl monomers.

The process of this invention has many advantages over the conventional one.

First, it is possible to use the same apparatus and conditions as that used for the production of ordinary acrylic polyols, because the process employs lactone-modified vinyl monomers which has been synthesized previously. According to the conventional technology, the process for producing acrylic polyol is separated from the process for ring opening polymerization of lactone, and the reaction time is too long to justify industrial production.

Secondly, the process of this invention can be applied to the production of acrylic polyol which uses a low-boiling solvent. According to the conventional technology, the addition reaction of lactone to acrylic polyol in a low-boiling solvent is too slow to justify industrial production.

Another great advantage of this invention is that the quantity of metal catalyst used for ring opening reaction of lactone can be reduced to about one-tenth as compared with the conventional process. According to the conventional process, the catalyst is added in an amount from 50 to 200 ppm for the total amount of acrylic polyol, solvent, and ε-caprolactone, whereas according to the process of this invention, 30 to 100 ppm of catalyst is sufficient for the lactone-modified vinyl monomer which is one component of acrylic polyol. Therefore, the polymer produced according to the process of this invention is very light in color, and is not adversely affected by the catalyst when used as a paint.

The ε-caprolactone-modified hydroxyl (meth)acrylate ester used in this invention is produced preferably by using a stannous halide (except fluoride) as the catalyst.

Conventionally used tin catalysts, such as stannous octoate, dibutyltin oxide, and dibutyltin laurate, are so weak in catalytic activity that several hundred ppm is required to carry out the reaction of ε-caprolactone and hydroxyalkyl (meth)acrylate ester. The quantity of catalyst can be reduced by raising the reaction temperature, but this involves the danger of causing thermal polymerization in the reaction of the acrylate ester.

Highly active catalysts include organo-titanium compounds, such as tetrabutyl titanate, tetrapropyl titanate, and tetraethyl titanate. These catalysts are about ten times more active than the organostannous catalysts, and they are capable of promoting the reaction of ε-caprolactone and hydroxyalkyl (meth)acrylate ester at a comparatively low temperature. However, these organotitanium compounds cannot be used on account of the following fatal weakness. Organotitanium compounds are not only very active as a catalyst for ring opening of ε-caprolactone to hydroxyl groups, but also they are very active for ester interchange reaction. Therefore, if ring opening reaction of ε-caprolactone is performed for hydroxyalkyl di(meth)acrylate ester using an organotitanium compound as the catalyst, the ester interchange reaction also proceeds, forming di(meth)acrylate ester, as shown in the following chemical equation.

Once the difunctional (meth)acrylate as above is contained in the lactone-modified hydroxyalkyl (meth)acrylate ester, the reaction product is not suitable for synthesizing an acrylic copolymer from it, because the polymer formed increases in viscosity by a polymerization reaction to form a gel eventually. This is because the difunctional acrylate brings about three-dimensional crosslinking.

For the reason mentioned above, it has not been successful to synthesize an acrylic copolymer from lactone-modified hydroxyalkyl (meth)acrylate ester.

The present inventors found that a stannous halide (except fluoride) is an extremely active catalyst for ring opening of ε-caprolactone and brings about almost no ester interchange reaction. The present inventors applied such a catalyst to the synthesis of lactone-modified hydroxyalkyl (meth)acrylate ester and then to the synthesis of acrylic copolymers. Their attempt was successful to obtain acrylic polymers without viscosity increase and gelation in the polymerization reaction.

Thus, the process of this invention makes it possible to produce acrylic polymers of high-solid type from lactone-modified acrylic monomers.

The catalyst to be used for synthesis of lactone-modified acrylic monomer is preferably stannous chloride, stannous bromide, or stannous iodide.

Stannous chloride and stannous bromide are paricularly preferable to yield monomers with little discoloration. The catalyst should be used in an amount from 1 to 1000 ppm, preferably 5 to 100 ppm, based on the total quantity charged. The reaction temperature is from 80° to 150° C., preferably from 100° to 140° C. It is preferable to add to the reaction system a commonly used polymerization inhibitor such as hydroquinone, hydroquinone monomethyl ether, and phenothiazine in an amount from 0.01 to 5 wt %, preferably from 0.05 to 1.0 wt %.

The hydroxyl group-containing acrylic or methacrylic ester which is to be modified with ε-caprolactone includes hydroxyethyl methacrylate, hydroxyethyl acrylate, hydroxypropyl methacrylate ester, hydroxypropyl acrylate, hydroxybutyl methacrylate, and hydroxybutyl acrylate, and mixtures thereof. These compounds are represented by the formula:

(where $R_1$ is H or $CH_3$; $R_2$ is $C_mH_{2m}$; and m is 2, 3, or 4.)

Other lactone compounds than ε-caprolactone can be used together with ε-caprolactone. The average value of n in the ε-caprolactone-modified vinyl monomer represented by the above formula is 0.3 to 5, preferably 0.5 to 3. If the average value of n is greater than 5, the resulting acrylic copolymer is poor in solubility in the solvent.

The ε-caprolactone-modified vinyl monomer accounts for 5 to 70 wt %, preferably 10 to 50 wt %, in the resulting acrylic copolymer. If the quantity is less than 5 wt %, the resulting polymer is not sufficiently flexible and reactive. If the quantity is more than 70 wt %, the resulting copolymer is too soft. The polymerizable vinyl monomer which is to be copolymerized with ε-caprolactone-modified vinyl monomer includes alkyl (meth)acrylate ester (such as methyl, ethyl, propyl, butyl, isobutyl, 2-ethylhexyl, lauryl, and cyclohexyl ester), (meth)acrylonitrile, styrene, substituted styrene, vinyl chloride, vinyl ac-etate, and N,N'-dialkylhydroxyethyl (meth)acrylate, In addition to the above vinyl monomers, the hydroxyl group-containing monomer includes hydroxyalkyl (meth)acrylate (such as hydroxyethyl (meth)acrylate, hydroxypropyl (meth)acrylate, and hydroxybutyl (meth)acrylate), allyl alcohol, N-methylol acrylamide, hydroxyethyl vinyl ether, and hydroxyethyl butyl maleate. The carboxyl group-containing vinyl monomer includes monoglycidyl ester such as "Cardular E" (made by Shell Chemical) and a hydroxyl group-containing polymerizable monomer such as "AOE" (made by Daicel Ltd.) obtained by addition of long-chain α-olefin monoepoxide. Further, it is also possible to use alkyd resin and oil-free alkyd resin having polymerizable double bonds. Further, it is also possible to use carboxyl group-containing vinyl monomer such as acrylic acid, methacrylic acid, itaconic acid, fumaric acid, monobutyl maleate, and crotonic acid.

These polymerizable vinyl monomers are used in an amount from 95 to 30 wt %, preferably 90 to 50 wt %.

According to the process of this invention, the copolymer is produced by using a common radical initiator, e.g., a peroxide such as dibenzyl peroxide, ditertiarybutyl peroxide, tertiary-butyl peroxybenzoate, and dicumyl peroxide, or an azo-compound such as azobisisobutyronitrile. The degree of polymerization may be controlled by adding a chain transfer agent such as a mercapto compound.

Polymerization is usually performed by solution polymerization; but polymerization can also be accomplished without a solvent. The solvent includes toluene, xylene, butyl acetate, ethyl acetate, methyl ethyl ketone, methyl isobutyl ketone, ethyl cellosolve acetate, and butyl cellosolve acetate.

The coating copolymer of this invention is an acrylic copolymer having hydroxyl groups, and this coating copolymer can be cured with a known crosslinking agent such as amino resin and polyisocyanate.

The coating copolymer of this invention can be applied to coatings of automotive elastic bumpers and plastics, crack resistant concrete mortar, and low-temperature elastic paint which utilizes the low-temperature characteristics of polycaprolactone.

The following examples will further illustrate the present invention which by no means limit the invention. In the examples, parts are given by weight.

EXAMPLE 1

2446 parts of 2-hydroxyethyl methacrylate (2-HEMA), 2146 parts of ε-caprolactone (ε-CL), 22.5 parts of hydroquinone monomethyl ether (HQME) and 0.225 parts of stannous chloride ($SnCl_2$) as reaction catalyst were charged in a four-neck flask provided with an air-introducing tube, thermometer, condenser and stirrer, and allowed to react at 120° C. for 18 hours while air was introduced therein. Conversion of ε-caprolactone was 99.4% and the hue of the reaction product was 1 on the Gardner color scale When the resulting lactone modified 2-hydroxyethyl methacrylate was copolymerized with another monomer, an excellent acrylic polyol resin was obtained (see Polymerization Example 1).

EXAMPLE 2

545 parts of 2-hydroxyethyl ethacrylate, 955 parts of ε-caprolactone, 3 parts of hydroquinone monomethyl ether as polymerization inhibitor and 0.075 parts of stannous chloride as catalyst were charged in the same device as in Example 1 and the reaction was carried out at 120° C. for 8 hours while air was introduced therein. Conversion of ε-caprolactone was 99.0% and the hue of the reaction product was 1 on the Gardner scale.

When the resulting lactone-modified 2-hydroxyethyl methacrylate was copolymerized with another monomer, an excellent acrylic polyol resin was obtained (see Application Example 2).

COMPARATIVE EXAMPLE 1

799 parts of 2-hydroxyethyl methacrylate, 701 parts of ε-caprolactone, 3 parts of hydroquinone monomethyl ether and 0.15 parts of tetrabutyl titanate (TBT) were charged in the same device as in Example 1 and the reaction was carried out at 120° C. for 16 hours while air was introduced therein. Conversion of ε-caprolactone was 99.6% and the hue of the reaction product was 2 on the Gardner scale. When the product was copolymerized in the same manner as in Application Example 1, viscosity of the reaction mixture was increased in the course of the reaction and the mixture finally gelled to make it impossible to obtain the acrylic polyol resin (Application Example 4).

COMPARATIVE EXAMPLE 2

1816 parts of 2-hydroxyethyl methacrylate, 3184 parts of ε-caprolactone, 10 parts of hydroquinone monomethyl ether and 0.5 part of tetrabutyl titanate were charged in the same device as in Example 1 and the reaction was carried out at 120° C. for 13 hours while air was introduced therein. Conversion of ε-caprolactone was 99.2% and the hue of the reaction product was 3 on the Gardner scale. When the product was copolymerized in the same manner as in Application Example 1, an acrylic polyol resin having a high viscosity was obtained, though no gelation was recognized (Application Example 5).

EXAMPLE 3

504 parts of 2-hydroxyethyl acrylate (2-HEA), 496 parts of ε-caprolactone, 5 parts of hydroquinone monomethyl ether and 0.1 part of stannous chloride were charged in the same device as in Example 1 and the reaction was carried out at 110° C. for 13 hours while air was introduced therein. Conversion of ε-caprolactone was 99.3% and the hue of the reaction product was less than 1 on the Gardner scale. When the product was copolymerized in the same manner as in Application Example 1, an excellent acrylic polyol resin was obtained (Application Example 3).

Reactants, reaction conditions and properties of the products in Examples 1–3 and Comparative Examples 1–2 are summarized in Table 1.

acrylic polyol resin. Properties of the resin solution are shown in Table 2.

POLYMERIZATION EXAMPLES 2 to 5

Each of the ε-caprolactone-modified acrylic monomers obtained in Examples 2 and 3 and Comparative Examples 1 and 2 was polymerized in the same device and under the same conditions as in Application Example 1. Excellent, transparent acrylic polyol resin solutions could be obtained from the monomers obtained in Examples 2 and 3. However, when the monomers obtained in Comparative Examples 1 and 2 were used, the reaction liquids were thickened and finally gelled and the resin solutions could not be obtained.

The results are shown in Table 2.

TABLE 2

| | | Copolymerization of lactone-modified acrylic monomer and properties of the resin | | | | |
|---|---|---|---|---|---|---|
| | | Polymerization Example | | | | |
| | | 1 | 2 | 3 | 4 | 5 |
| Starting materials (parts by weight) | Butyl acetate | 333 | " | " | " | " |
| | Toluene | 333 | " | " | " | " |
| | Di-tert-butyl peroxide | 10 | " | " | " | " |
| | Styrene | 400 | " | " | " | " |
| | Methyl methacrylate | 100 | " | " | " | " |
| | Butyl acrylate | 100 | " | " | " | " |
| | Methacrylic acid | 10 | " | " | " | " |
| | ε-Caprolactone-modified acrylic monomer | Ex. 1 400 | Ex. 2 400 | Ex. 3 400 | Comp. Ex. 1 400 | Comp. Ex. 2 400 |
| | AIBN | 10 | 10 | 20 | 10 | 10 |
| Properties of acrylic resin solution | Solid content (%) | 61.7 | 60.7 | 60.1 | — | — |
| | Viscosity (Gardner) | $Z_3$–$Z_4$ | $Z_1$–$Z_2$ | Y 14 Z | — | — |
| | Acid value (KOH mg/g) | 5.28 | 5.06 | 5.48 | — | — |
| | Hydroxyl value (KOH mg/g) | 53.3 | 35.4 | 56.3 | — | — |
| | Hue (Gardner) | ≦1 | ≦1 | ≦1 | — | — |

TABLE 1

| | | Ex. 1 | Ex. 2 | Ex. 3 | Comp. Ex. 1 | Comp. Ex. 2 |
|---|---|---|---|---|---|---|
| Reactants | 2-HEMA (mol) | 1 | 1 | — | 1 | 1 |
| | 2-HEA | — | — | 1 | — | — |
| | ε-CL | 1 | 2 | 1 | 1 | 2 |
| | HQME (ppm) | 5000 | 2000 | 5000 | 2000 | 2000 |
| | $SnCl_2$ (ppm) | 50 | 50 | 50 | — | — |
| | TBT (ppm) | — | — | — | 100 | 100 |
| Reaction Conditions | Reaction temp. (°C.) | 120 | 120 | 110 | 120 | 120 |
| | Reaction time (hr) | 18 | 8 | 13 | 16 | 13 |
| Properties of the product | ε-CL Conversion (%) | 99.4 | 99.0 | 99.3 | 99.6 | 99.2 |
| | Hydroxyl value (KOH mg/g) | 225 | 113 | 267 | 223 | 112 |
| | Acid value (KOH mg/g) | 4.7 | 3.0 | 6.3 | 3.4 | 2.7 |
| | Hue (Gardner) | 1 | 1 | 1> | 2 | 3 |
| | Ethylene glycol dimethacrylate or ethylene glycol diacrylate (%) | 0.71 | 0.38 | 0.53 | 3.96 | 1.11 |

POLYMERIZATION EXAMPLE 1

333 parts of butyl acetate, 333 parts of toluene and 10 parts of di-tert-butyl peroxide were charged in a four-neck flask provided with a thermometer, reflux condenser, nitrogen gas inlet and stirrer. The temperature was elevated to 120° C. Then, 400 parts of styrene, 100 parts of methyl methacrylate, 100 parts of butyl acrylate, 10 parts of methacrylic acid, 400 parts of ε-caprolactone-modified 2-hydroxyethyl methacrylate synthesized in Example 1 and 10 parts of azobisisobutyronitrile were added dropwise to the mixture over 4 hours. Thereafter, the reaction was continued for 4 hours to obtain a transparent solution of an excellent

COMPARATIVE EXAMPLE 3

Into the same apparatus as in the above Example 1 were placed 799 parts of 2-hydroxyethyl methacrylate, 701 parts of ε-caprolactone, 3 parts of hydroquinone monomethyl ether, and 0.15 part of tetrabutyl titanate as a catalyst. Reaction was performed at 120° C. for 16 hours while passing air thereinto, whereby lactone-modified 2-hydroxyethyl methacrylate was obtained. The degree of conversion of ε-caprolactone was 99.6%, the hue of the reaction product was 2 (Gardner), and the conent of by-product ethylene glycol dimethacrylate was 4.0 wt %.

COMPARATIVE EXAMPLE 4

Into the same apparatus as in the above Example 1 were placed 1816 parts of 2-hydroxyethyl methacrylate, 3184 parts of ε-caprolactone, 10 parts of hydroquinone mononethyl ether, and 0.5 part of tetrabutyl titanate. Reaction was performed at 120° C. for 13 hours while passing air thereinto, whereby lactone-modified 2-hydroxyethyl methacrylate was obtained. The degree of conversion of ε-caprolactone was 99.2%, the hue of the reaction product was 3 (Gardner), and the content of by-product ethylene glycol dimethacrylate was 1.1 wt %.

POLYMERIGATION EXAMPLE 6

Into the same flask as used in Polyarization Example 1 were placed 333 parts of butyl acetate, 333 parts of toluene, and 10 parts of ditertiary-butyl peroxide. The reactants were heated to 120° C., and 400 parts of styrene, 100 parts of methyl methacrylate, 100 parts of butyl acrylate, 10 parts of methacrylic acid, 400 parts of lactone-modified 2-hydroxyethyl methacrylate prepared by using tetrabutyl titanate catalyst in Comparative Example 3, and 10 parts of azobisisobutyronitrile were added dropwise over 4 hours. Three hours after the start of dropwise addition, the reactants became viscous, forming a gel, and it was impossible to obtain the intended acrylic copolymer.

POLYMERIZATION EXAMPLE 7

Into the safe flask as used in Polymerization Example 1 were placed 333 parts of butyl acetate, 333 parts of toluene, and 10 parts of ditertiary-butyl peroxide. The reactants were heated to 120° C., and 400 parts of styrene, 100 parts of methyl methacrylate, 100 parts of butyl acrylate, 10 parts of methacrylic acid, 400 parts of lactone-modified 2-hydroxyethyl methacrylate prepared by using tetrabutyl titanate catalyst in Comparative Example 4, and 10 parts of azobisisobutyronitrile were added dropwise over 4 hours. Two hours after the start of dropwise addition, the reactants became viscous, forming a gel, and it was impossible to obtain the intended acrylic copolymer.

COATING EXAMPLES 1 to 6

The lactone-modified acrylic polyol resins obtained In Polymerization Examples 1 and 2 were incorporated with various kinds of crosslinking agents and then coated to a steel plate. The coating was dried and cured to yield coating films The properties of the coating films are shown in Table 3. As compared with typical commercial acrylic polyol resins, the resin of this invention was found to be superior in flexibility, solvent resistance, and chemical resistance. The coating film was prepared under the following conditions.

Curing agent:
Polyisocyanate:
(1) Duranate 24A-100 (made by Asahi Chemical; hexamethylene diisocyanate/water adduct of the Biuret type)
(2) Takenate D-110N (made by Takeda Chemical Industries, Ltd.; polyisocyanate derived from xylene diisocyante)
(3) IPDI-T1890 (made by Huls; trimer of isophorone diisocyanate)
Melamine resin
(1) Uban 62 (made by Mitsui Toatsu Chemicals, Inc.; isobutylated melamine)
Blending ratio:
Isocyanate crosslinking:      OH/NCO = 1
Melamine crosslinking:        Polyol/melamine = 70/30
                              (by weight of solids)
Coating:
Applied to a 0.3 to 0.5 mm thick polished mild steel plate. The thickness of dried coating film was 30 to 50 microns.
Drying conditions:
Urethane crosslinking:        80° C., 60 minutes, and
                              additionally 50° C., 24 hours.
Melamine crosslinking:        150° C., 15 minutes.

The film coating of this invention is superior in solvent resistance, flex resistance, and film elongation to the conventional acrylic copolymers which are not modified with lactone.

In Table 3, the mark "o" indicates "excellent" and "x" indicates "bad".

TABLE 3

| | Coating Example | | | | | |
|---|---|---|---|---|---|---|
| | 1 | 2 | 3 | 4 | 5 | 6 |
| Blending | | | | | | |
| Acrylic polyol | Polymerization Example 1 | | | | | |
| Curing agent | Duranate 24A-100 | Duranate 24A-100 | Duranate 24A-100 | Takenate D-110N | IPDI T-1890 | Melamine Uban 62 |
| Film properties | | | | | | |
| Pencil hardness (Mitsubishi Uni) | HB | B | HB | 3H | H | HB |
| Cross-cut test | 100/100 | 100/100 | 100/100 | 100/100 | 100/100 | 100/100 |
| Impact resistance (500 g, ½") cm | 50≦ | 50≦ | 50≦ | 50≦ | 20 | 40 |
| Erichsen, mm | 8≦ | 8≦ | 8≦ | 8≦ | 6 | 8≦ |
| Water resistance (50° C., 48 hr) | | | | | | |
| Whitening | O | O | O | X | O | X |
| Blister | O | O | O | O | O | O |
| Cross-cut | 100/100 | 100/100 | 100/100 | 100/100 | 80/100 | 100/100 |
| Alkali resistance (5% NaOH, 25° C., 48 hr) | O | O | O | O | O | O |
| Acid resistance (5%, HCl, 25° C., 48 hr | O | O | O | O | O | O |
| solvent resistance (xylene rubbing, 100 times) | O | O | O | O | X | X |
| Bending test (2 mm) | O | O | O | O | O | O |
| Stain resistance (black magic ink, 48 hr) | O | O | O | O | O | X |

TABLE 3-continued

| | Coating Example | | | | | |
|---|---|---|---|---|---|---|
| | 1 | 2 | 3 | 4 | 5 | 6 |
| Film elongation (%) | 61 | 77 | — | — | — | — |

In the above illustrated examples and comparative examples, the number of ε-caprolactone unit added is: n=1, 2, 1, 2 and 1 in Example 1, Example 2, Comparative Example 1, Comparative Example 2 and Example 3, respectively.

An example where n is 10 will be described below.

EXAMPLE 4

Into an apparatus as used in Example 1 were introduced 130 parts of 2-hydroxyethylmethacrylate, 1140 parts of ε-caprolactone, 1.3 parts of hydroquinone monomethylether as an inhibitor for polymerization and 0.064 part of stannous chloride. The reaction mixture was reacted at 120° C. for 15 hours, while air was blowed thereinto. After the reaction had finished, it was found that the conversion of ε-caprolactone was 99.0 wt. % and the hue of the reaction product was 1 or below according to the Gardner color scale.

Furthermore, the obtained ε-caprolactone-modified 2-hydroxyethyl methacrylate was co-polymerized with another monomer to produce an acrylic polyol having excellent properties. In the Example, conditions and results are:

| 2-HEMA | 1 mol |
|---|---|
| ε-CL | 10 mols |
| HQME | 1000 ppm |
| SnCl$_2$ | 50 ppm |
| reaction temperature | 120° C. |
| reaction time | 15 hrs. |
| hydroxyl value (KOH mg/g) | 44 |
| acid value | 2.1 |
| ethylene glycol dimethacrylate (%) | 0.10 |

As mentioned above, the copolymer according to the invention is useful as a coating. In addition, it has the following utilities as: a photocurable resin, a diluent capable of reacting another photocurable resin, a flexibility-adding agent for styrene-acrylonitrile copolymer or styrene-acrylonitrile-butadiene copolymer, a kind of acrylic resin, an adhesive, material for lenses of glasses having flexibility, an acrylic emulsion in particular of the reaction type, a flexible diluent capable of reaction which may be replaced for styrene to an unsaturated polyester and a polymerizable polyurethane elastomer.

The photocurable composition which comprises the copolymer according to the invention will be described below.

The composition usually comprises 40 to 95 wt. % of a resin having at least one ethylenical unsaturation in the molecule and having a molecular weight of at least 300, 60 to 5 wt. % of an ε-caprolactone-modified 2-hydroxyethyl acrylate or methacrylate having the following formula:

where R is hydrogen or methyl and n is an integer of one to ten, and 0.1 to 10 parts by weight, based on 100 parts by weight of the above mentioned two ingredients, of a photosensitizer.

The photocurable composition has a desired photocurability and provides advantages such as high boiling point, low viscosity and low irritation to the skin of the human body.

PHOTOCURABLE COMPOSITION EXAMPLES 1 and 2

1900 g of 3,4-epoxycyclohexylmethyl-3,4-epoxycyclohexane carboxylate, 720 g of acrylic acid, 7.2 g of an amine catalyst and 10 g of hydroquinone were reacted at 110°–130° C. for 2 hours to produce an epoxy-acrylate resin having an acid value of 3.0, a molecular weight of 417 and a viscosity of about 500 poises at 50° C., appearing like yellowbrown syrup 80 parts of the obtained epoxy-acrylate resin was dissolved in 20 parts of an ε-caprolactone-modified 2-hydroxyethylacrylate and thereafter mixed with 2 parts of benzoin methylether to produce a photocurable composition. An average molar ratio of ε-caprolactone to 2-hydroxyethylacrylate was 1:1 and 2:1 in Photocurable Composition Examples 1 and 2 respectively.

The embodiments of the invention in which an exclusive property of privilege is claimed are defined as follows:

1. A process for preparation of a poly(ε-caprolactone)-modified hydroxyalkyl acrylate or hydroxyalkyl methacrylate of the formula:

wherein R$_1$ is hydrogen or methyl, R$_2$ is alkylene, and n has a value of from 0.3 to 20 on the average, which consists essentially of effecting ring opening polymerization of ε-caprolactone with hydroxyalkyl acrylate or hydroxyalkyl methacrylate, the amount of ε-caprolactone being in the range of 1 to 20 mols per mol of hydroxyalkyl acrylate or hydroxyalkyl methacrylate, in the presence of 1 to 1000 ppm, based on the total contents of the reaction system, of a catalyst selected from the group consisting of stannous chloride, stannous bromide, and stannous iodide, as the sole catalyst in the reaction mixture, at a polymerization temperature in the range of 80° C. to 150° C. and in the presence of air.

2. A process as claimed in claim 1, wherein said polymerization is further conducted in the presence of 0,01 to 5 wt. % of a polymerization inhibitor selected from the group consisting of hydroquinone, hydroquinone monomethyl ether and phenothiazine.

3. A process as claimed in claim 1, wherein the amount of ε-caprolactone is in the range of 1 to 5 mols per mol of said hydroxyalkyl acrylate or hydroxyalkyl methacrylate, the amount of said catalyst is in the range of 5 to 100 ppm, and the polymerization temperature is in the range of 100° C. to 140° C.

4. A process as claim in claim 1, wherein said catalyst is stannous chloride.

5. A process as claimed in claim 1, wherein said catalyst is stannous iodide.

6. A process as claimed in claim 1, wherein said catalyst is stannous bromide.

7. A process for the preparation of poly(ε-caprolactone)-modified hydroxyethyl methacrylate comprising the steps of:
  (a) forming a reaction mixture of 2446 parts of 2-hydroxyethyl methacrylate, 2146 parts of ε-caprolactone, 225 parts of hydroquinone monomethyl ether and 0.225 parts of stannous chloride;
  (b) introducing air into contact with said reaction mixture;
  (c) reacting said reaction mixture at a temperature of 120° C. for 18 hours; and
  (d) recovering poly(ε-caprolactone)-modified hydroxyethyl methacrylate from said reaction mixture.

8. A process for the preparation of poly(ε-caprolactone)-modified hydroxyethyl acrylate comprising the steps of:
  (a) forming a reaction mixture of 504 parts of 2-hydroxyethyl acrylate, 496 parts of ε-caprolactone, 5 parts of hydroquinone monomethyl ether and 0.1 parts of stannous chloride;
  (b) introducing air into contact with said reaction mixture;
  (c) reacting said reaction mixture at a temperature of 110° C. for 13 hours; and
  (d) recovering poly(ε -caprolactone)-modified hydroxyethyl acrylate from said reaction mixture.

* * * * *